(12) United States Patent
Umezawa (10) Patent No.: US 8,537,439 B2
(45) Date of Patent: Sep. 17, 2013

(54) PRINT CALIBRATION PROCESSING APPARATUS, IMAGE FORMING APPARATUS, PRINT CALIBRATION PROCESSING METHOD AND IMAGE FORMING METHOD

(75) Inventor: Hiroki Umezawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 244 days.

(21) Appl. No.: 13/205,733

(22) Filed: Aug. 9, 2011

(65) Prior Publication Data

US 2012/0038957 A1 Feb. 16, 2012

Related U.S. Application Data

(60) Provisional application No. 61/372,677, filed on Aug. 11, 2010.

(51) Int. Cl.
*H04N 1/40* (2006.01)
*G03F 3/08* (2006.01)

(52) U.S. Cl.
USPC .......................................... 358/504; 358/521

(58) Field of Classification Search
None
See application file for complete search history.

(56) References Cited

U.S. PATENT DOCUMENTS

| 8,107,134 | B2 * | 1/2012 | Kang | 358/474 |
| 2009/0033955 | A1 | 2/2009 | Harigai | |
| 2010/0296822 | A1 * | 11/2010 | Takada | 399/9 |
| 2011/0280450 | A1 * | 11/2011 | Nepomniachtchi et al. | 382/112 |

FOREIGN PATENT DOCUMENTS

JP 2000-092324 3/2000

OTHER PUBLICATIONS

U.S. Appl. No. 13/087,485, filed Apr. 15, 2011.

* cited by examiner

*Primary Examiner* — Douglas Tran
(74) *Attorney, Agent, or Firm* — Turocy & Watson, LLP (57) ABSTRACT

A print calibration processing apparatus includes a test image output section configured to outputs plural patches for gradation characteristic generation to an image forming section, a gradation characteristic data generation section configured to use, as a read object, a test chart obtained by printing the test images on both the sides of the print sheet by the image forming section while shifting print positions of the test images in a front and back direction, reads the images on a first and second side of the test chart, and generates gradation characteristic data of front test images on the first side and the second side and gradation characteristic data of show-through test images on the first and second side, a correction data generation section configured to determine a correction value of maximum gradation based on gradation characteristics of the front and the show-through test images, and a correction section configured to correct gradation of image data.

16 Claims, 6 Drawing Sheets

PRINT CALIBRATION PROCESSING APPARATUS, IMAGE FORMING APPARATUS, PRINT CALIBRATION PROCESSING METHOD AND IMAGE FORMING METHOD

CROSS-REFERENCE TO RELATED APPLICATION

This application is based upon and claims the benefit of priority from: U.S. provisional application 61/372,677, filed on Aug. 11, 2010; the entire contents of which are incorporated herein by reference.

FIELD

Embodiments described herein relate generally to a technique to reduce so-called show-through in which an image printed on a print surface of a print sheet is seen on a back side opposite to the print surface.

BACKGROUND

In an image forming apparatus such as a printer or an MFP (Multi Function Peripheral), with respect to a sheet as a print medium on which an image such as a character is printed, sheets with various characteristics, such as recycle paper, thin sheet, and thick sheet, can be used.

According to the characteristic of a sheet to be used, or the density of a print image, show-through can occur in which a color material penetrated into the print sheet can be visually recognized from the back side of the print sheet. For example, in one-sided printing, the show-through deteriorates the appearance of the back side. Besides, in one-sided printing and two-sided printing, since the color material blurs, the image quality of the print surface is deteriorated. In the two-sided printing, when an image on the print surface overlaps with a show-through image, there is a case where reading becomes difficult.

DETAILED DESCRIPTION

In general, according to one embodiment, a print calibration processing apparatus includes a test image output section configured to output a plurality of patches for gradation characteristic generation, as two-sided test images to be printed on both sides of a print sheet, to an image forming section, a gradation characteristic data generation section configured to use, as a read object, a test chart obtained by printing the test images on both the sides of the print sheet by the image forming section while shifting print positions of the test images on a front side and a back side, to read the images on a first side of the test chart and on a second side opposite to the first side, and to generate gradation characteristic data of front test images on the first side and the second side and gradation characteristic data of show-through test images on the first side and the second side, a gradation correction data generation section configured to determine a correction value of maximum gradation based on gradation characteristics of the front test images and gradation characteristics of the show-through test images generated by the gradation characteristic data generation section, a gradation correction data storage section configured to store the gradation correction data generated by the gradation correction data generation section, and a gradation correction section configured to correct gradation of image data outputted from the image forming section based on the gradation correction data stored in the gradation correction data storage section.

Hereinafter, an image forming apparatus including a print calibration processing apparatus of an embodiment will be described in detail with reference to the drawings.

Figure 1:
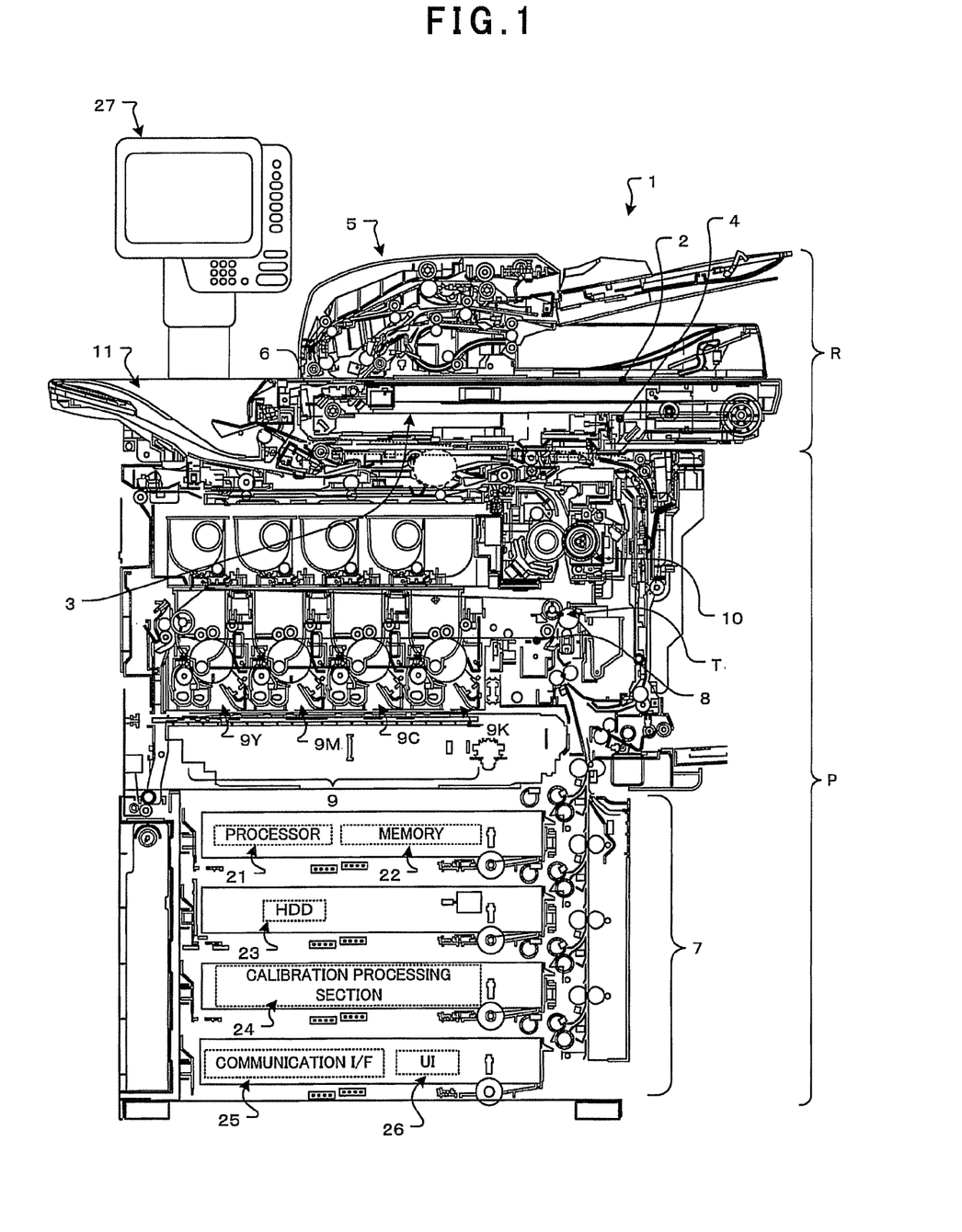
FIG. 1 is a vertical sectional view showing an image forming apparatus of an embodiment.
Figure 2:
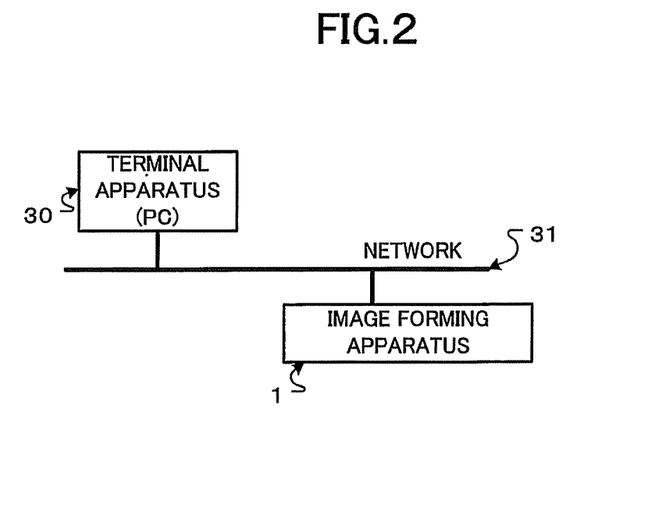
FIG. 2 is a view showing a structure of an image processing system including the image forming apparatus.
Figure 3:
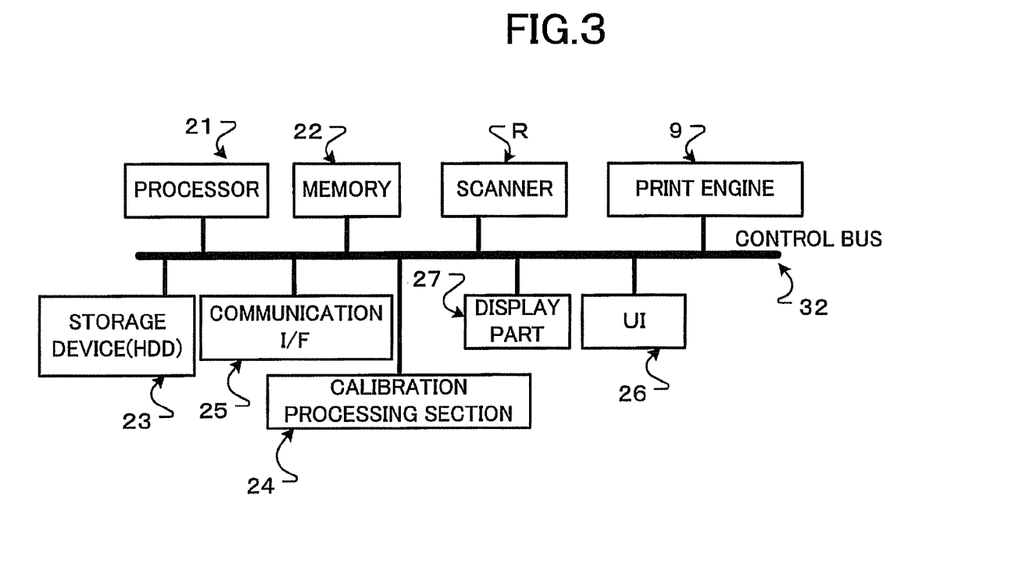
FIG. 3 is a view showing an example of a hardware structure of the image forming apparatus.
Figure 4:
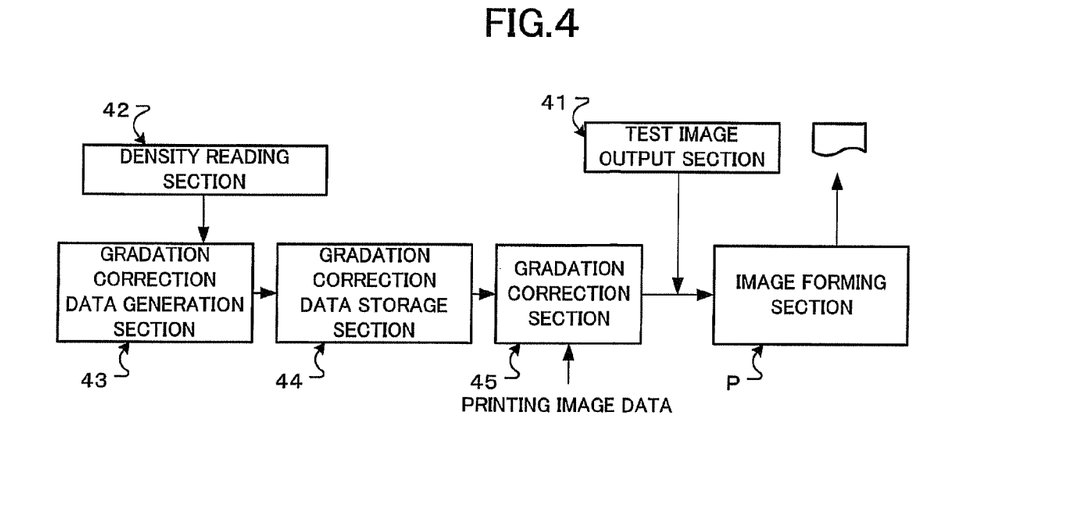
FIG. 4 is a view showing a block diagram of a calibration processing section.

FIG. 1 is a view showing the whole structure of the image forming apparatus of the embodiment, and shows an MFP (Multi Function Peripheral) as an example of an image forming apparatus having a printer function, a copy function, a two-sided document reading function and the like. FIG. 2 shows a structure of an image processing system including the image forming apparatus of FIG. 1. FIG. 3 shows an example of a hardware structure of the image forming apparatus shown in FIG. 1. FIG. 4 shows a block diagram of a calibration processing section.

As shown in FIG. 1, the image forming apparatus 1 of the embodiment includes an image reading section R and an image forming section P. Besides, as shown in FIG. 2, a terminal apparatus 30 such as a personal computer generates print data such as a print job, and transmits the data to the image forming apparatus 1 through a network 31. The image forming apparatus 1 receives the transmitted print data, and outputs an image corresponding to the print data onto a print sheet.

The image reading section (scanner) R has a function to scan and read an image of a sheet document and a book document. The image reading section R includes a scanning optical system 3 below a document table glass 2 and a light receiving section 4 to receive a document reflected light guided by the scanning optical system 3. Besides, in the image reading section R, an openable and closable ADF (Auto Document Feeder) 5 is disposed over the document table glass 2, and automatically feeds a document to an ADF slit glass 6 disposed adjacently to the document table glass 2.

When a document placed on the document table glass 2 is read, a document surface is pointed downward and the document is placed on the document table glass 2. When a start button is pressed, reading of the document starts. When the reading of the document starts, the document is irradiated by the scanning optical system 3 moving in a sub-scanning direction, the reflected light of the document is guided to the light receiving section 4, and the document is read. Accordingly, when the document surface of the document is pointed upward, the document is placed on the document table glass 2, and reading of the document is performed, the back side of the document is read.

The image forming section P has a function to form a developer image on a sheet based on an image read from the document by the image reading section R or image data transmitted to the image forming apparatus from an external equipment. The image forming section P includes a paper feed cassette section 7 including paper feed cassettes at plural stages, an intermediate transfer belt 8, image forming process sections (print engine section) 9 (9Y, 9M, 9C, 9K) of yellow (Y), magenta (M), cyan (C) and black (K) including photoconductive drums, developing devices and the like, a fixing device 10, and a discharge tray 11. Besides, the image forming section P includes an auto two-sided unit in which after one side of a sheet fed from the paper feed cassette is printed, the sheet is reversed and is again guided to the image forming process section.

The image forming apparatus 1 of the embodiment includes a processor (control section) 21, a memory section 22, a hard disk section (storage device) 23, a calibration processing section 24, a communication interface (I/F) 25, a user interface (UI) 26, a display section 27 and the like.

The processor 21 executes a specified process based on an image processing program stored in the memory section 22 or the storage device 23, and controls the operation of the image forming apparatus.

The memory 22 includes, for example, a RAM (Random Access Memory), a ROM (Read Only Memory), a DRAM (Dynamic Random Access Memory), an SRAM (Static Random Access Memory), a VRAM (Video RAM) and the like, and has a function to store various information and programs used in the image forming apparatus.

Here, the image forming process sections 9 (9Y, 9M, 9C, 9K) form electrostatic latent images on photoconductive surfaces of the photoconductive drums of the respective colors for transferring developer images onto a sheet, and develops and visualizes the electrostatic latent images formed on the photoconductive surfaces of the photoconductive drums by the developing devices of the respective colors. In this way, the developer images formed on the photoconductive drums of the respective colors are transferred (so-called primary transfer) onto a belt surface of the intermediate transfer belt 8, and the developer images conveyed by rotation of the intermediate transfer belt 8 are transferred onto the conveyed sheet at a specified secondary transfer position T.

The developer images transferred on the sheet are heated and fixed to the sheet by the fixing device 10. The sheet on which the developer images are heated and fixed is conveyed along a conveyance path by plural conveyance roller pairs and is sequentially discharged onto the discharge tray 11.

Figure 6:
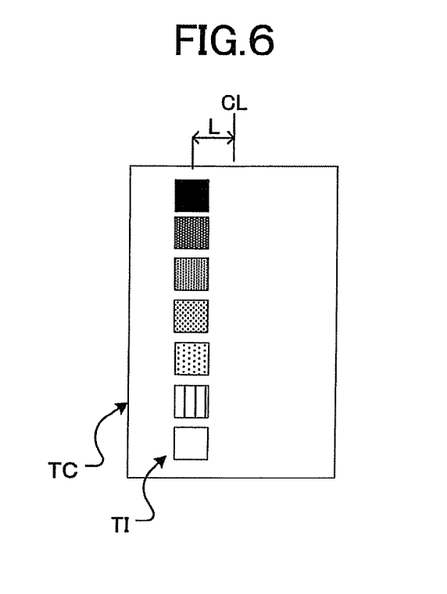
FIG. 6 is a view showing a printed test chart.

FIG. 4 shows a block diagram of the calibration processing section 24. When a calibration operation is selected by operating a selection switch of the display section 27, the operation starts. The calibration processing section 24 includes a test image output section 41 to form a test image on a sheet from the paper feed cassette in which sheets as a show-through prevention object are contained, and the test image output section 41 outputs the test image to the image forming section P. FIG. 6 shows a test chart TC on which a test image T1 is printed on the sheet as the show-through prevention object. In the test image T1 printed on the test chart TC of FIG. 6, plural patches different in density are sequentially formed in a sub-scanning direction in order of from a thin density patch to a thick density patch. The test image TI is formed on one side (left side) of the test chart TC spaced from the center in the main conveyance direction spaced by a specified distance L.

Figure 7A:
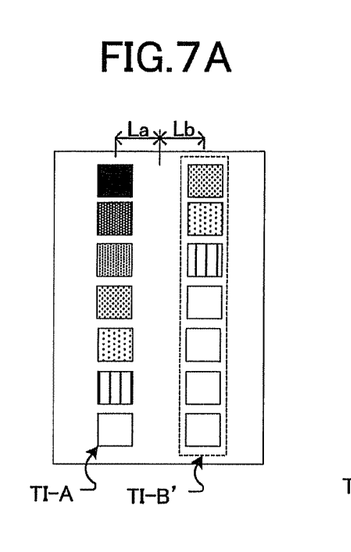
FIG. 7A is a view showing a first side of a test chart.

In this embodiment, the test image TI is formed on both sides (one of the sides is an A side, and the other side is a B side) of the test chart TC. The printing of the test image TI is automatically performed on the A side and the B side of the test chart TC by using a two-sided printing mechanism. As shown in FIG. 7A, a test image (front test image) TI-A formed on the A side is formed on one side of the test chart TC spaced from the center CL by a specified distance La. With respect to the test chart TC on which the un-fixed test image TI is formed, the test image TI-A on the A side is fixed by the fixing device 10, the front and back thereof are reversed, and the test chart is again conveyed to the transfer position T through a two-sided printing path. A B-side test image (front test image) TI-B is formed on one side of the test chart TC, which is conveyed to the transfer position T while the B side is made the print surface, spaced from the center CL by a distance Lb. After the image is fixed by the fixing device 10, the test chart is discharged onto the discharge tray 11.

Figure 7B:
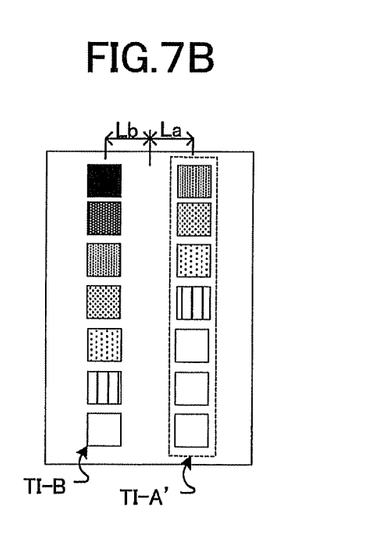
FIG. 7B is a view showing a second side of the test chart.

FIG. 7A shows the A-side test image TI-A printed on the A side and a state of show-through of the B-side test image TI-B printed on the B side, and FIG. 7B shows the B-side test image TI-B printed on the B side and a state of show-through of the A-side test image TI-A printed on the A side. In the test chart TC, the A-side test image TI-A printed on the A side and the B-side test image TI-B printed on the B side are formed to be shifted right and left.

Thus, on the A side of the test chart TC, the A-side test image TI-A and the show-through B-side test image TI-B are seen to be arranged right and left. Similarly, on the B side of the test chart TC, the B-side test image TI-B and the show-through A-side test image TI-A are seen to be arranged right and left. Incidentally, the A side does not represent the front side of the test chart TC, and similarly, the B side does not represent the back side of the test chart TC. The A side and the B side only represent one side of the test chart and the other side thereof.

Since the permeability of color material, such as ink or toner, is not always the same between the front side and the back side of the print sheet, there is a case where a density difference occurs between the show-through B-side test image TI-B shown in FIG. 7A and the show-through A-side test image TI-A shown in FIG. 7B. When the density of the show-through A-side test image TI-A shown in FIG. 7B is higher than the density of the show-through B-side test image TI-B shown in FIG. 7A, the show-through on the B side of the test chart TC becomes more noticeable than the show-through on the A side.

The calibration processing section 24 includes a density reading section 42 to read the density of the A side and the B side of the test chart TC, and in this embodiment, the image reading section R is used. However, a dedicated density meter may be provided.

The test chart TC on both sides of which the test image TI is printed is taken out from the discharge tray 11 by the operator, and is set on the ADF 5. When the start button is pressed, the image reading section R reads the A side of the test chart TC, and then reads the B side.

The density reading section 42 calculates density values of the patches of the A-side test image TI-A printed on the A side of the test chart TC and density values of the patches of the show-through B-side test image TI-B'. Besides, the density reading section calculates density values of the patches of the B-side test image TI-B printed on the B side of the test chart TC and density values of the patches of the show-through A-side test image TI-A'.

Figure 8:
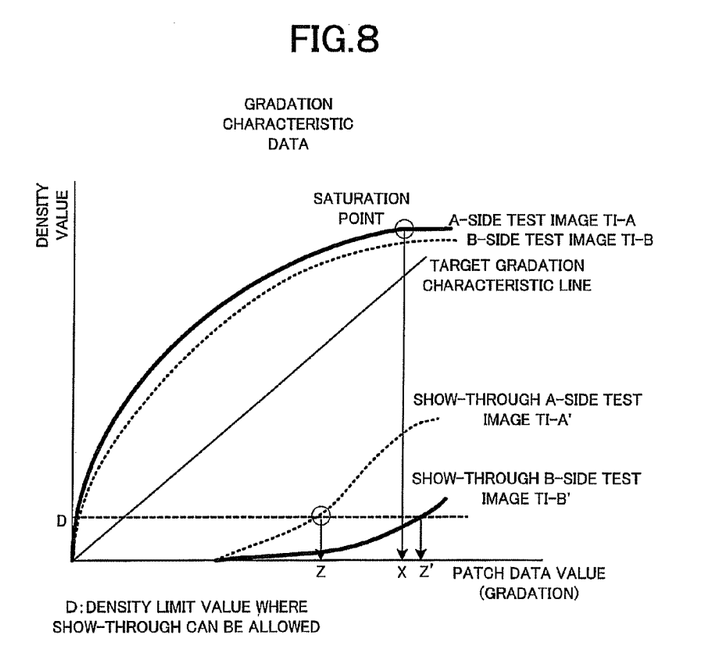
FIG. 8 is a view showing gradation characteristic data.

FIG. 8 shows the calculation results of the calculation of the density reading section 42. The gradation characteristic of the A-side test image TI-A obtained by reading the test chart TC of the A side shown in FIG. 7A is almost saturated at a point X in a high gradation area of the patch data value (gradation). In FIG. 8, a density value D is a density limit value where the show-through can be allowed, and may be a fixed value or may be changed. The show-through B-side test image TI-B' is read from an intermediate gradation area, and reaches the density value D in a high gradation area slightly exceeding the point X.

Besides, the gradation characteristic of the B-side test image TI-B obtained by reading the test chart TC of the B side shown in FIG. 7B is almost saturated at the point X in the high gradation area of the patch data value (gradation). The show-through A-side test image TI-A' is read from an intermediate gradation area, and reaches the density value D at a point Z lower in gradation than the point X.

Based on the read results of the density reading section 42, a gradation correction data generation section 43 generates gradation correction data to reduce the show-through for the A side and the B side.

Incidentally, in FIG. 8, the horizontal axis indicates the patch data value (gradation), and the vertical axis indicates the density value, and a linear characteristic line having an inclination of 45 degrees indicates a target gradation characteristic line.

Here, in the density gradation characteristic data of the show-through A-side test image TI-A' and the show-through B-side test image TI-B', the gradation correction data generation section 43 obtains patch data values (show-through limit gradation values) Z and Z' corresponding to the previously set density limit value D where the show-through can be allowed.

The patch data value Z of the show-through A-side test image TI-A' is smaller (low gradation value) than the saturation point X of the A-side test image TI-A and the B-side test image TI-B on the print surface. The patch data value Z' of the show-through B-side test image TI-B' is larger than the patch data value Z and is larger than the patch data value X.

Figure 10:
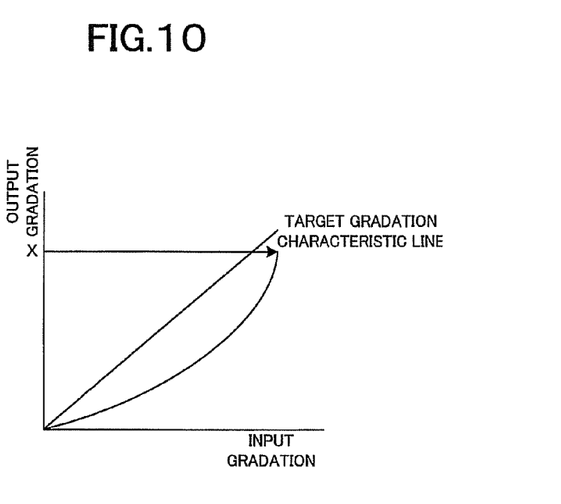
FIG. 10 is a view showing a printing gradation correction characteristic diagram in which a maximum gradation value is X.

When both the patch data values Z and Z' are larger than the patch data value X of the saturation point, even when image formation is performed with any output gradation in which the density of the image actually formed on the sheet does not exceed the saturation point X, show-through does not occur. In this case, as shown in FIG. 10, the gradation correction data generation section 43 generate two-sided printing gradation correction data so that the saturation point X becomes the maximum output gradation.

Figure 9:
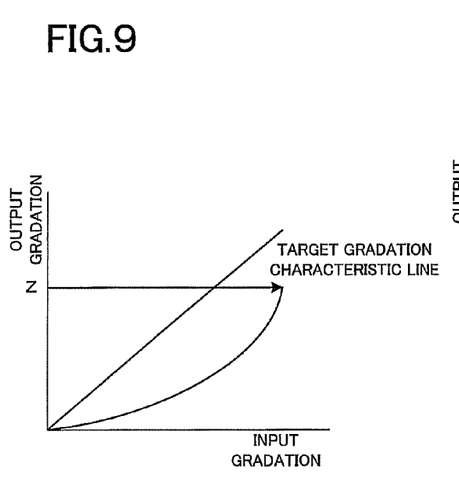
FIG. 9 is a view showing a printing gradation correction characteristic diagram in which a maximum gradation value is Z.

However, when one of or both of the patch data values Z and Z' are smaller than the patch data value X, show-through occurs. Thus, the magnitudes of both the patch data values Z and Z' are compared, and the gradation correction data generation section 43 generate two-sided printing gradation correction data so that the smaller patch data value Z becomes the maximum output gradation as shown in FIG. 9. With respect to an intermediate gradation of the gradation correction data, since the patch data value Z obtained by reading the B side of the test chart TC is used, the B-side test image TI-B printed on the B side is used, and a characteristic line opposite to the gradation characteristic line of the surface density with respect to the target gradation characteristic line is made the gradation correction data.

With respect to the patch data value X at the saturation point, the saturation point of the A-side test image TI-A and that of the B-side test image TI-B are assumed to have the same value. However, the patch data value X may be the value of one of the A-side test image TI-A and the B-side test image TI-B, or may be an average value thereof.

The gradation correction data generated by the gradation correction data generation section 43 is stored in a gradation correction data storage section 44, and is transmit to a gradation correction section 45 at the time of actual two-sided printing to correct printing image data, and the corrected data is outputted to the image forming section P.

Figure 5:
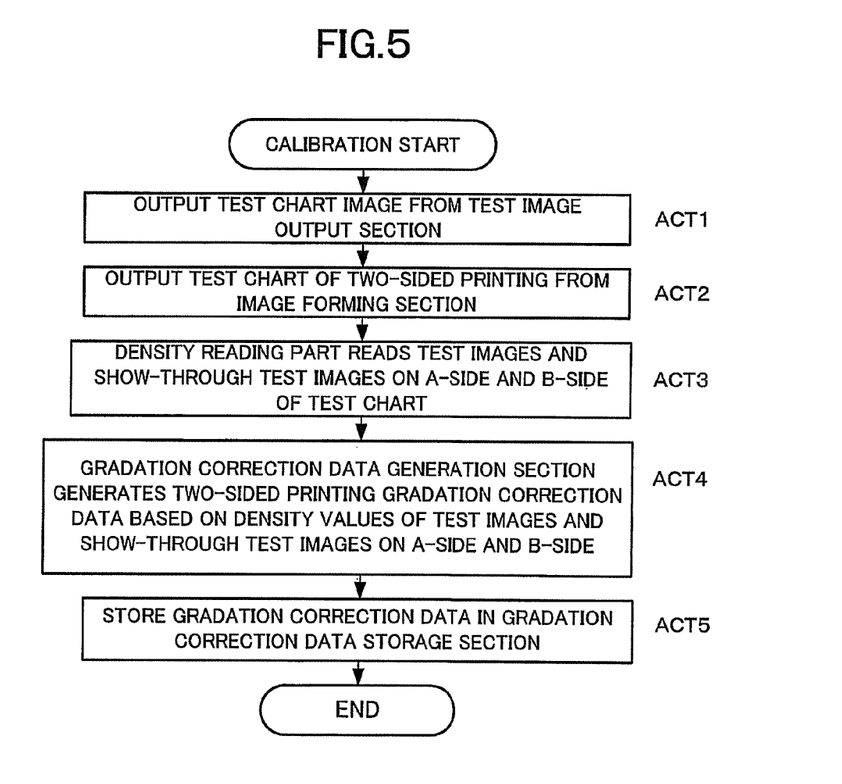
FIG. 5 is a flowchart showing an operation of the calibration processing section.

FIG. 5 shows a processing operation of the calibration processing section 24. When calibration starts, the test image output section 41 outputs the test chart image (ACT 1), and the image forming section P outputs the two-side printed test chart (ACT 2). Thereafter, the density reading section 42 reads the density values of the patches of the test chart and the show-through test chart of the A side and the B side of the two-sided printed test chart (ACT 3). The gradation correction data generation section 43 generates the gradation correction data based on the density values of the test chart and the show-through test chart of the A side and the B side read at ACT 3 (ACT 4), and stores the gradation correction data in the gradation correction data storage section 44 (ACT 5).

Figure 11:
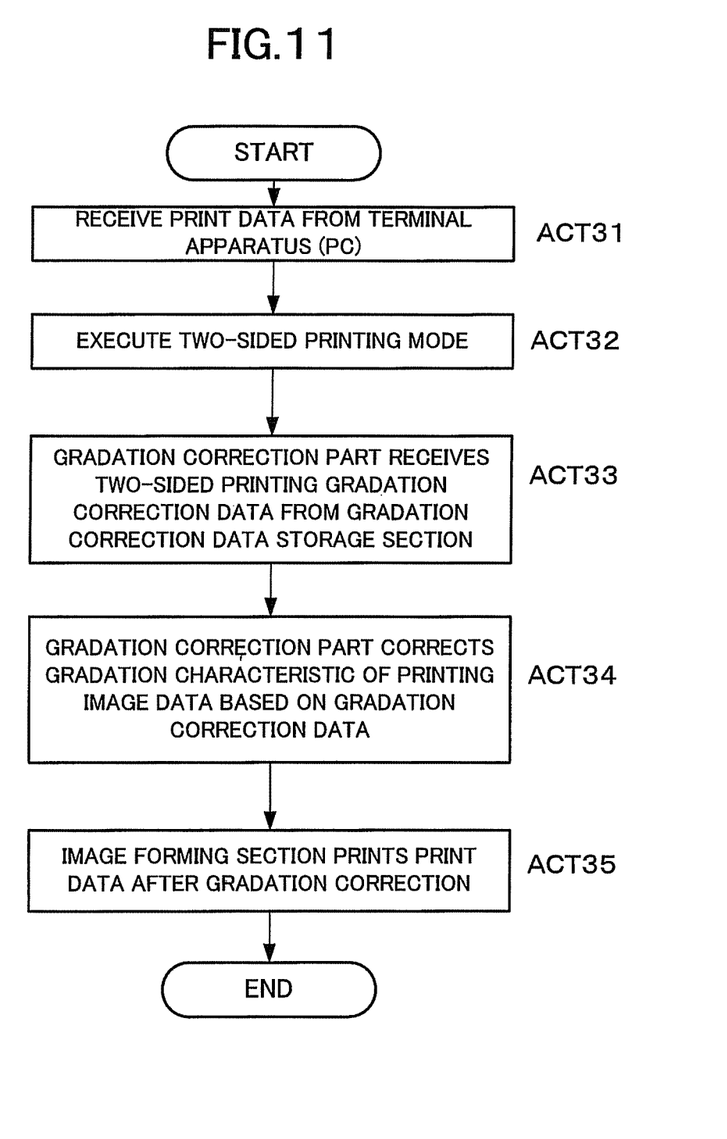
FIG. 11 is a flowchart in which show-through gradation correction is performed and two-sided printing is performed.

Next, after the calibration processing section 24 ends the calibration process, when print data from the personal computer 30 is transmitted to the image forming apparatus 1, printing with reduced show-through is performed in accordance with a flowchart shown in FIG. 11.

FIG. 11 shows the flowchart of printing the two-sided printing data from the personal computer 30 in the embodiment.

The image forming apparatus 1 receives the printing image data from the personal computer 30 (ACT 31). Next, the two-sided printing mode is executed (ACT 32). The gradation correction section 45 receives two-sided printing gradation correction data from the gradation correction data storage section 44 (ACT 33). The gradation correction section 45 corrects the printing image data based on the gradation correction data (ACT 34). Thereafter, the image forming section P prints the printing image data after the gradation correction (ACT 35). As shown in FIG. 8, when the patch data value Z of the show-through test image is smaller than the saturation point X of the front test image, the maximum of the output gradation is Z with respect to the input gradation as shown in FIG. 9. Thus, the show-through of the image on the A side and the B side to the opposite side is suppressed.

When the patch data values Z and Z' of the show-through test images are larger than the patch data value of the saturation point of the front test image, the maximum of the output gradation with respect to the input gradation is X as shown in FIG. 10. Thus, the show-through in the two-sided printing does not occur.

Incidentally, until here, although the description is made using the density value, the two-sided printing gradation correction data may be generated based on lightness by using read L* values of CIELAB.

This embodiment can provide the calibration in which poor visibility due to show-through at the time of two-sided printing is solved.

Incidentally, in this embodiment, although the patch is formed in monochrome, the patch may be formed in colors. Besides, in this embodiment, although the description is made on the image forming apparatus of the electrophotographic system as the recording system, the embodiment can be applied also to an image forming apparatus of an ink-jet recording system.

In the process explained in FIG. 5, although the case is exemplified in which the internal data processing processor 21 executes the program previously stored in the storage area provided in the image forming apparatus 1, the program may be downloaded from the network to the MFP 1, or a computer readable recording medium storing the program may be installed in the MFP 1. Any recording medium may be used as long as the recording medium can store the program and can be read by the computer. As the recording medium, for example, a RAM (Random Access Memory), a ROM (Read Only Memory), a DRAM, an SRAM (static Random Access Memory), a VRAM (Video RAM), and a flash memory can be used.

The present invention can be carried out in various forms without departing from the spirit or the principal feature thereof. Thus, the foregoing embodiments are merely exemplary in any points, and should not be restrictedly interpreted. The scope of the invention is described in the claims, and is not restricted by the text of the specification. Further, all modifications, various improvements, substitutions and alterations belonging to the equivalent scope of the claims are within the scope of the invention.

What is claimed is:

1. A print calibration processing apparatus comprising:
   a test image output section configured to output a plurality of patches for gradation characteristic generation, as two-sided test images to be printed on both sides of a print sheet, to an image forming section;
   a gradation characteristic data generation section configured to use, as a read object, a test chart obtained by printing the test images on both the sides of the print sheet by the image forming section while shifting print positions of the test images on a front side and a back side, to read the images on a first side of the test chart and on a second side opposite to the first side, and to generate gradation characteristic data of front test images on the first side and the second side and gradation characteristic data of show-through test images on the first side and the second side;
   a gradation correction data generation section configured to determine a correction value of maximum gradation based on gradation characteristics of the front test images and gradation characteristics of the show-through test images generated by the gradation characteristic data generation section:
   a gradation correction data storage section configured to store the gradation correction data generated by the gradation correction data generation section; and
   a gradation correction section configured to correct gradation of image data outputted from the image forming section based on the gradation correction data stored in the gradation correction data storage section.

2. The apparatus of claim 1, wherein the plurality of patches for gradation characteristic generation include a plurality of patches different in density.

3. The apparatus of claim 2, wherein the gradation correction data generation section compares show-through limit gradation values where the gradation characteristics of the show-through test images on the first side and the second side reach a limit value of show-through density, and generates the gradation correction data in which the smaller show-through limit gradation value is the maximum gradation.

4. The apparatus of claim 2, wherein the gradation correction data generation section obtains a saturation gradation value where a density of the front test image on the first side or the second side saturates, compares show-through limit gradation values where the gradation characteristics of the show-through test images on the first side and the second side reach a limit value of show-through density, and generates the gradation correction data in which when the smaller show-through limit gradation value is smaller than the saturation gradation value, the smaller show-through limit gradation value is the maximum gradation.

5. An image forming apparatus comprising:
   an image reading section configured to read a document image;
   an image forming section configured to receive image data read by the image reading section and to print an image on a print sheet;
   a test image output section configured to output a plurality of patches for gradation characteristic generation, as two-sided test images to be printed on both sides of a print sheet, to the image forming section;
   a gradation characteristic data generation section configured to use, as a read object, a test chart obtained by printing the test images on both the sides of the print sheet by the image forming section while shifting print positions of the test images on a front side and a back side, to read the images on a first side of the test chart and on a second side opposite to the first side, and to generate gradation characteristic data of front test images on the first side and the second side and gradation characteristic data of show-through test images on the first side and the second side;
   a gradation correction data generation section configured to determine a correction value of maximum gradation based on gradation characteristics of the front test images and gradation characteristics of the show-through test images generated by the gradation characteristic data generation section:
   a gradation correction data storage section configured to store the gradation correction data generated by the gradation correction data generation section; and
   a gradation correction section configured to correct gradation of the image data outputted from the image forming section based on the gradation correction data stored in the gradation correction data storage section.

6. The apparatus of claim 5, wherein the plurality of patches for gradation characteristic generation include a plurality of patches different in density.

7. The apparatus of claim 6, wherein the gradation correction data generation section compares show-through limit gradation values where the gradation characteristics of the show-through test images on the first side and the second side reach a limit value of show-through density, and generates the gradation correction data in which the smaller show-through limit gradation value is the maximum gradation.

8. The apparatus of claim 6, wherein the gradation correction data generation section obtains a saturation gradation value where a density of the front test image on the first side or the second side saturates, compares show-through limit gradation values where the gradation characteristics of the show-through test images on the first side and the second side reach a limit value of show-through density, and generates the gradation correction data in which when the smaller show-through limit gradation value is smaller than the saturation gradation value, the smaller show-through limit gradation value is the maximum gradation.

9. A print calibration processing method comprising:
   outputting a plurality of patches for gradation characteristic generation, as two-sided test images to be printed on both sides of a print sheet, to an image forming section;
   using, as a read object, a test chart obtained by printing the test images on both the sides of the print sheet by the image forming section while shifting print positions of the test images on a front side and a back side; reading the images on a first side of the test chart and on a second side opposite to the first side; generating gradation characteristic data of front test images on the first side and the second side and gradation characteristic data of show-through test images on the first side and the second side;

determining a correction value of maximum gradation based on the generated gradation characteristics of the front test images and the gradation characteristics of the show-through test images:

storing the gradation correction data in a gradation correction data storage section; and correcting gradation of image data outputted from the image forming section based on the gradation correction data stored in the gradation correction data storage section.

10. The method of claim 9, wherein the plurality of patches for gradation characteristic generation include a plurality of patches different in density.

11. The method of claim 10, wherein show-through limit gradation values where the gradation characteristics of the show-through test images on the first side and the second side reach a limit value of show-through density are compared, and the gradation correction data is generated in which the smaller show-through limit gradation value is the maximum gradation.

12. The method of claim 10, wherein a saturation gradation value where a density of the front test image on the first side or the second side saturates is obtained, show-through limit gradation values where the gradation characteristics of the show-through test images on the first side and the second side reach a limit value of show-through density are compared, and the gradation correction data is generated in which when the smaller show-through limit gradation value is smaller than the saturation gradation value, the smaller show-through limit gradation value is the maximum gradation.

13. An image forming method comprising:
reading a document image;
receiving read image data and printing an image on a print sheet by an image forming section;
outputting a plurality of patches for gradation characteristic generation, as two-sided test images to be printed on both sides of a print sheet, to the image forming section;
using, as a read object, a test chart obtained by printing the test images on both the sides of the print sheet by the image forming section while shifting print positions of the test images on a front side and a back side; reading the images on a first side of the test chart and on a second side opposite to the first side; generating gradation characteristic data of front test images on the first side and the second side and gradation characteristic data of show-through test images on the first side and the second side;

determining a correction value of maximum gradation based on the generated gradation characteristics of the front test images and the gradation characteristics of the show-through test images:

storing the gradation correction data in a gradation correction data storage section; and correcting gradation of image data outputted from the image forming section based on the gradation correction data stored in the gradation correction data storage section.

14. The method of claim 13, wherein the plurality of patches for gradation characteristic generation include a plurality of patches different in density.

15. The method of claim 14, wherein show-through limit gradation values where the gradation characteristics of the show-through test images on the first side and the second side reach a limit value of show-through density are compared, and the gradation correction data is generated in which the smaller show-through limit gradation value is the maximum gradation.

16. The method of claim 14, wherein a saturation gradation value where a density of the front test image on the first side or the second side saturates is obtained, show-through limit gradation values where the gradation characteristics of the show-through test images on the first side and the second side reach a limit value of show-through density are compared, and the gradation correction data is generated in which when the smaller show-through limit gradation value is smaller than the saturation gradation value, the smaller show-through limit gradation value is the maximum gradation.

* * * * *